No. 727,868. PATENTED MAY 12, 1903.
G. WEILER.
DOUGH RAISER.
APPLICATION FILED JAN. 10, 1903.
NO MODEL.
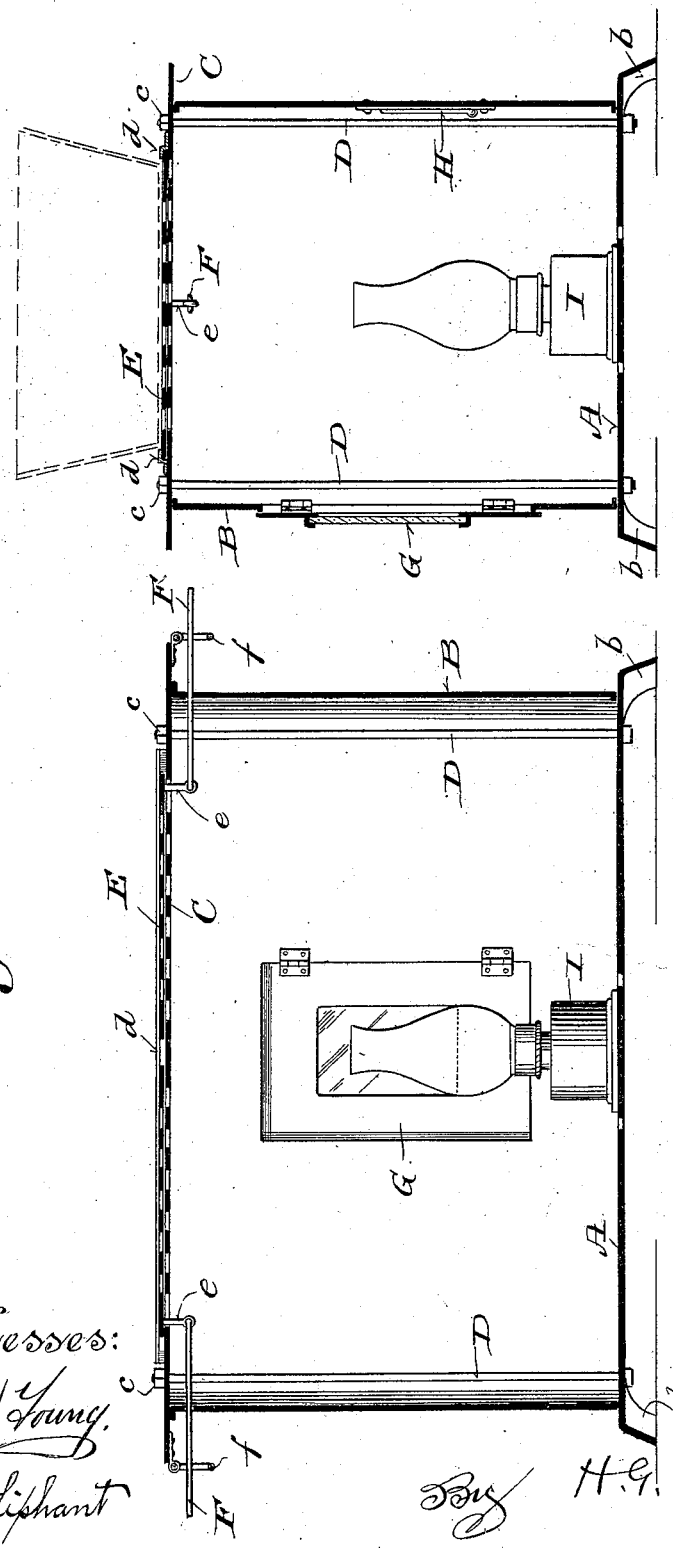

No. 727,868. Patented May 12, 1903.

UNITED STATES PATENT OFFICE.

GEORGE WEILER, OF UNIONGROVE, WISCONSIN.

DOUGH-RAISER.

SPECIFICATION forming part of Letters Patent No. 727,868, dated May 12, 1903.

Application filed January 10, 1903. Serial No. 138,551. (No model.)

*To all whom it may concern:*

Be it known that I, GEORGE WEILER, a citizen of the United States, and a resident of Uniongrove, in the county of Racine and State of Wisconsin, have invented certain new and useful Improvements in Dough-Raisers; and I do hereby declare that the following is a full, clear, and exact description thereof.

My invention has for its object to provide simple, economical, and portable dough-raisers, organized to also serve as warmers for flour that is to be mixed with raised dough, said invention consisting in certain peculiarities of construction and combination of parts hereinafter particularly set forth, with reference to the accompanying drawings, and subsequently claimed.

Figure 1 of the drawings represents a vertical longitudinal section of a dough-raiser and flour-warmer in accordance with my invention; Fig. 2, a vertical transverse section of the same, and Fig. 3 a perspective view thereof.

Referring by letter to the drawings, A indicates a preferably sheet-metal base having openings therein and provided with legs $b$, that may be flanges of said base. Set on the base is a shell B, that is also preferably of sheet metal and of oblong shape. Surmounting the shell is a perforated top C, that is preferably of the same material as said shell, the latter being preferably provided with flanges that oppose said base and top. Bolt-rods D extend through the base and top, and nuts $c$ are run on the rods to clamp said base and top against the shell, the whole constituting a box.

The box-top C is provided with guides $d$ for perforated slides E, and stems $e$, depending from the slides through slots in said box-top to come inside the box-shell B, are in connection with rods F, that extend through ends of said shell, adjustment of the slides, by means of the rods, serving to control the perforations in said top.

The shell or body B of the box is provided with a preferably mica-glazed door G, and a thermometer H is shown inside of said shell opposite the door. Handles $f$ are also provided in connection with the shell.

Set in the box on its base A is a lamp I, and air to support combustion of the lamp is admitted through the openings in said base, the flame being regulated according as the thermometer shows from time to time that the temperature in the heater is higher or lower than a predetermined degree.

Dough to be raised and flour to be warmed are set in pans on top of the box above described, the slides E being adjusted to regulate the area of openings of the perforations in the top of said box, more heat being required for the dough than for the flour.

Having thus described my invention, what I claim as new, and desire to secure by Letters Patent, is—

A portable dough-raiser consisting of a box mounted on legs and provided with bottom openings, top perforations and a body-door; guides on the box-top, perforated slides engaging the guides, stems depending from the slides through box-top slots, rods extending through ends of the box and connected to the stems of said slides, and a lamp inclosed by the box.

In testimony that I claim the foregoing I have hereunto set my hand, at Uniongrove, in the county of Racine and State of Wisconsin, in the presence of two witnesses.

GEORGE WEILER.

Witnesses:
JOHN T. GITTINGS,
FLOYD E. COLING.